(12) United States Patent
Schmitz

(10) Patent No.: US 6,533,833 B1
(45) Date of Patent: Mar. 18, 2003

(54) METHOD OF APPARATUS FOR AIR AND LIQUID VACUUMING

(76) Inventor: Mark Schmitz, #10 High Meadow Pl., Copper Canyon, TX (US) 75077

( * ) Notice: Subject to any disclaimer, the term of this patent is extended or adjusted under 35 U.S.C. 154(b) by 0 days.

(21) Appl. No.: 09/865,164

(22) Filed: May 24, 2001

(51) Int. Cl.⁷ .................................................. A47L 7/00
(52) U.S. Cl. ........................ 55/385.1; 55/357; 55/359; 55/DIG. 3; 15/352; 15/353
(58) Field of Search ............... 55/385.1, 357, 55/359, DIG. 3; 15/352, 353; 96/329, 349, 361

(56) References Cited

U.S. PATENT DOCUMENTS

| | | | |
|---|---|---|---|
| 1,198,373 A | | 9/1916 | Olson |
| 3,562,844 A | | 2/1971 | Thompson et al. |
| 3,942,217 A | | 3/1976 | Bates |
| 4,151,627 A | | 5/1979 | Wisdom |
| 4,314,385 A | * | 2/1982 | Wimsatt et al. ............... 15/321 |
| D274,851 S | | 7/1984 | Schmitz |
| 4,542,556 A | * | 9/1985 | Hepple ......................... 15/353 |
| D287,665 S | | 1/1987 | Schmitz |
| 4,726,825 A | * | 2/1988 | Natale ..................... 55/DIG. 3 |
| 5,069,696 A | * | 12/1991 | Bruno, III ................. 55/DIG. 3 |
| 5,089,037 A | * | 2/1992 | Marsolais ................ 55/DIG. 3 |
| D338,292 S | | 8/1993 | Schmitz et al. |
| 5,237,719 A | * | 8/1993 | Dwyer, Jr. et al. ............ 15/253 |
| 5,259,854 A | * | 11/1993 | Newman ................. 55/DIG. 3 |
| 5,377,383 A | * | 1/1995 | Christensen .................. 15/353 |
| 5,513,415 A | * | 5/1996 | Kent et al. ...................... 15/353 |
| 5,840,091 A | * | 11/1998 | Strong ......................... 55/385.1 |
| 5,958,113 A | * | 9/1999 | Collins et al. ................. 96/329 |

* cited by examiner

*Primary Examiner*—David A. Simmons
*Assistant Examiner*—Minh-Chau T. Pham
(74) *Attorney, Agent, or Firm*—Jenkens & Gilchrist, P.C.

(57) ABSTRACT

A liquid collection vessel for an air and liquid vacuum system of the type incorporating an air vacuum unit coupled to the vessel for drawing air and liquid therein. The vessel includes a generally cylindrical housing having an upper region. An ingress nozzle is disposed in the upper region of the housing and is adapted for receiving air and liquid there through and into the housing in response to low pressure created by the vacuum unit coupled thereto. The ingress nozzle is further disposed angularly within the housing for discharging air and liquid into the housing in a descending, tangential flow pattern. An air intake manifold is likewise disposed within the housing and coupled to the air vacuum unit for drawing air out of the housing.

22 Claims, 5 Drawing Sheets

METHOD OF APPARATUS FOR AIR AND LIQUID VACUUMING

BACKGROUND OF THE INVENTION

1. Field of the Invention

The present invention relates to a method of and an apparatus for air and liquid vacuuming and, more particularly, but not by way of limitation, to an improved liquid collection vessel and fluid flow design for the suction of air and liquid from an area to be vacuumed.

2. History of Related Art

It is common to utilize motorized systems to create low pressure for vacuuming areas such as floors and the like. Typically, such vacuum systems incorporate a collection vessel and blower combination which maximize fluid flow therein to facilitate the vacuuming operation for purposes such as cleaning, dyeing or tinting. Conventional systems are typically capable of extracting and reclaiming excess liquid such as water, dyes or tints. It is also typical to steam clean carpeted areas by discharging steam that condenses into water, and sucking such discharged water back into the vessel. Examples of such carpet cleaning and dyeing systems are set forth and shown in U.S. Pat. Nos. 4,151,627; 3,942,217; 3,562,844; and 1,198,373. More specifically, carpet cleaning and dyeing machines of the type used by the assignee of the present invention include the following U.S. patents: D338,292, D287,655 and D274,851. As shown within the above-referenced patents, large vessels are typically utilized for housing the blowers typically needed for creating low pressure areas during the vacuuming operation and for storing water sucked therein. Flexible hoses are typically utilized in conjunction with the vessels for extending to the area to be cleaned, dyed or tinted, such as floor areas, and sucking both air and water there through for discharge within the vessel. The particular design of the vessel itself as well as the mechanism therein generally determines the efficiency of the vacuum operation.

It is well known, for example, to utilize cylindrical vessels and blowers to create low pressure therein, which low pressure (or vacuum) causes a sucking action through the above-referenced flexible hose. The hose then draws or sucks water and air there through. The water leaving the hose in the area of the vessel is sometimes deposited directly into the vessel or upon a baffle secured therein that deflects the water downwardly into the vessel while allowing the air to flow at various angles therein. The baffle design has been utilized for decades with various vessel shapes and has been effective in separating water from the flowing air to allow acceptable operation of the vacuum system for carpet cleaning and the like. One distinct efficiency consideration is, of course, the degree of suction created by the mechanism and the efficiency afforded by the sucking operation. Improvements in the equipment, including the vessel and its associated plumbing could improve air flow and thereby improve the ability to remove more water from the area being vacuumed which is a distinct advantage.

It is well known that increasing the size of the motor with a commensurate increase in the volume of air flow associated therewith can increase the suction ability of the unit. This improves the ability of the system to reclaim excess liquid from the surface being vacuumed. Increases in motor size may also create increases in cost, weight and size of the associated unit. In many instances, such increases are not commercially feasible, much less desirable. It would therefore be an advantage to increase the suction power of the unit without a commensurate increase in unit cost, size or weight. Such an increase could be affected by improvements in the design of the vessel and/or the system itself The present invention is designed to provide such an improvement by utilizing a vortex fluid flow configuration as hereinafter described.

SUMMARY OF THE INVENTION

The present invention relates to a method of and apparatus for vacuuming air and liquid such as water. More particularly, one aspect of the present invention includes a vacuum system collection vessel incorporating a housing having a vortex fluid flow design incorporated therein. In this manner, air and liquid drawn into the vessel by a vacuum unit or the like connected thereto, is induced to swirl within the housing by virtue of tangential flow introduction therein. The tangential flow introduction which increases the fluid flow dynamics in a manner facilitating an increased suction effect therewith. The increased suction effect further facilitates the drawing of air and liquid from an area to be vacuumed without increasing the size of the blower and/or other aspects of the equipment associated therewith.

In yet another aspect, the present invention relates to a vacuum system collection vessel and method and collecting air and liquid such as water, and includes a cylindrical housing body having a top section constructed of a transparent material allowing visibility of the vessel contents. An inner chamber is formed by the cylindrical body and communicates with an ingress nozzle. The ingress nozzle is connected to the upper region of the cylindrical body and is adapted to receive the air and water there through. The ingress nozzle may have threads thereon for connection to a hose. The ingress nozzle is also oriented at an acute angle, relative to the horizontal, extending into the inner chamber to discharge liquid therein in a descending tangential pattern. A liquid discharge fitting is also mounted in the lower region of the cylindrical body for the selective elimination of liquid therefrom. A transparent top section is also provided and forms a dome which is sealed along a rectangular opening formed in the top of the housing. A standpipe is incorporated and upstands through the rectangular opening in the housing body beneath the dome. The standpipe has a top portion, a lower portion, and a filter secured to the top portion. The filter is disposed vertically above the intake fitting for preventing liquid from entering the standpipe during operation.

During operation, an air vacuum unit coupled to the collection vessel sucks air and liquid through the intake tube and into the intake fitting through the angulated flow conduit. A vortex is formed by the tangential entry of the air and liquid in the inner chamber of the vessel. This vortex increases the efficiency of the suction of the air and liquid being drawn into the inner chamber. As a result, the efficiency of the system is improved by the assistance of the vortex created by the method and apparatus of the present invention.

BRIEF DESCRIPTION OF THE DRAWINGS

A more complete understanding of the method and apparatus of the present invention may be obtained by reference to the following detailed description when taken in conjunction with the accompanying drawings wherein.

DETAILED DESCRIPTION OF THE PREFERRED EMBODIMENTS

The present invention may be understood more readily by reference to the following detailed description of preferred embodiments of the invention and the figures.

Figure 1:
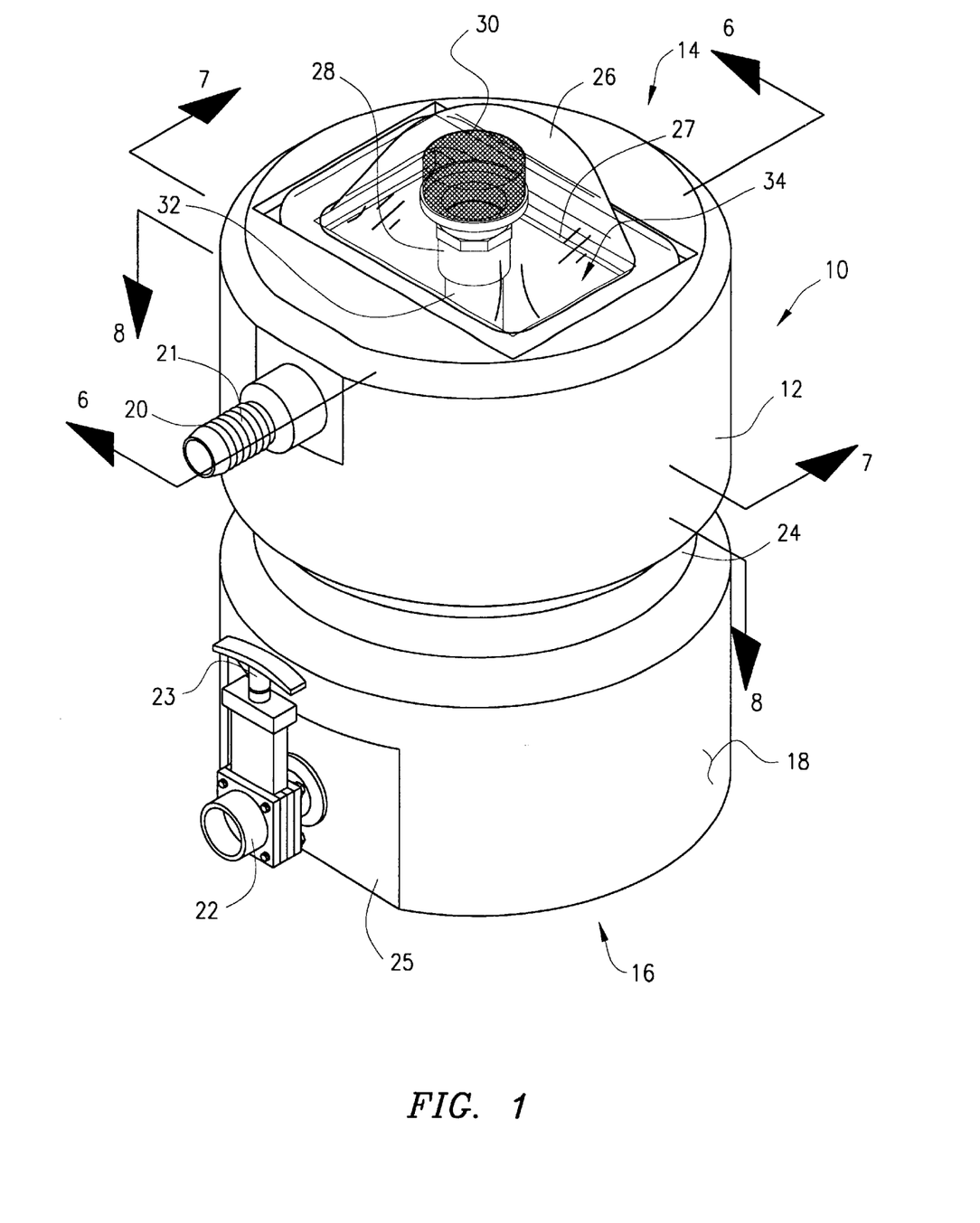
FIG. 1 is a perspective view of one embodiment of a vacuum system collection vessel constructed in accordance with the principles of the present invention.

Referring first to FIG. 1, there is shown a perspective view of a vacuum system collection vessel 10 constructed in accordance with the principles of the present invention. The system collection vessel 10 includes a generally cylindrical housing 12 having a top 14 opposite a bottom 16. The housing 12 further includes a generally cylindrical outer wall 18. The housing 12 may be roto-molded of polyethylene plastic or the like. A thickness in the range of ½" has been utilized, although a wide variety of thicknesses and sizes is possible. The particular housing 12 illustrated herein has such a ½" wall thickness and a height of 15" and a diameter of 14". These dimensions are by way of example only and are not intended to be limiting to the scope of the present invention, because a variety of sizes are contemplated.

Figure 9:
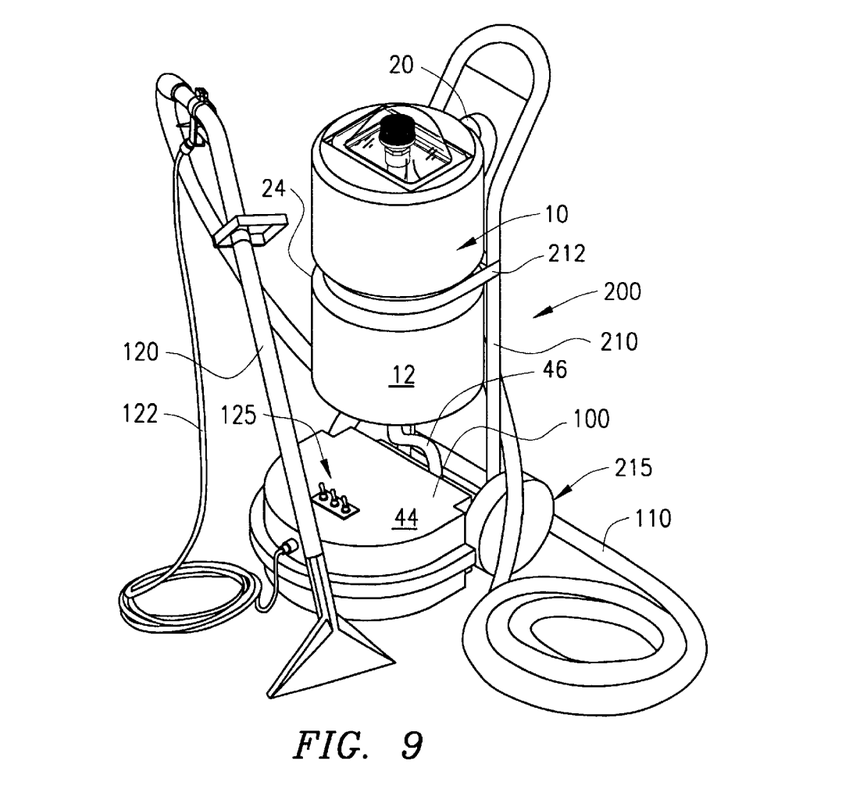
FIG. 9 is a perspective view of a hot water extractor system incorporating the vacuum system collection vessel of FIG. 1.

Still referring to FIG. 1, there is shown an ingress nozzle or intake fitting 20 having a plurality of threads 21, ridges or the like formed generally circumferentially therearound to provide securement of a hose (shown attached thereto in FIG. 9). Intake fitting 20 permits the ingress of air and liquid, such as water, vacuumed by the vacuum system collection vessel 10 in a manner described in more detail below. Liquid which enters through intake fitting 20 into the housing 12 is stored therein for selective discharge through discharge fitting 22. Discharge fitting 22 is shown with a discharge valve 23 and is mounted to a generally planar bulkhead 25 formed within the surface 18 of housing 12. Once the housing 12 is filled, the liquid may be drained through the fitting 22. A circumferential indentation 24 is also provided around the housing 12 providing structural integrity thereto. Because a vacuum is being pulled in housing 12, the indentation 24 helps prevent the housing from collapsing.

Referring still to FIG. 1, the top 14 of the vacuum system collection vessel 10 is constructed with a transparent dome 26 which may be formed of glass, plastic (such as Lexan®) or the like for sealing against a generally rectangular opening 27 formed therebeneath. Upstanding through the rectangular opening 27 is a stand pipe 28 having a screen, or filter 30 secured to the top portion thereof Stand pipe 28 further includes a lower stand pipe region 32 extending downwardly into an inner chamber 34 of housing 12 for collection of liquid therein and the flow of air therearound as described in more detail below.

Figure 2:
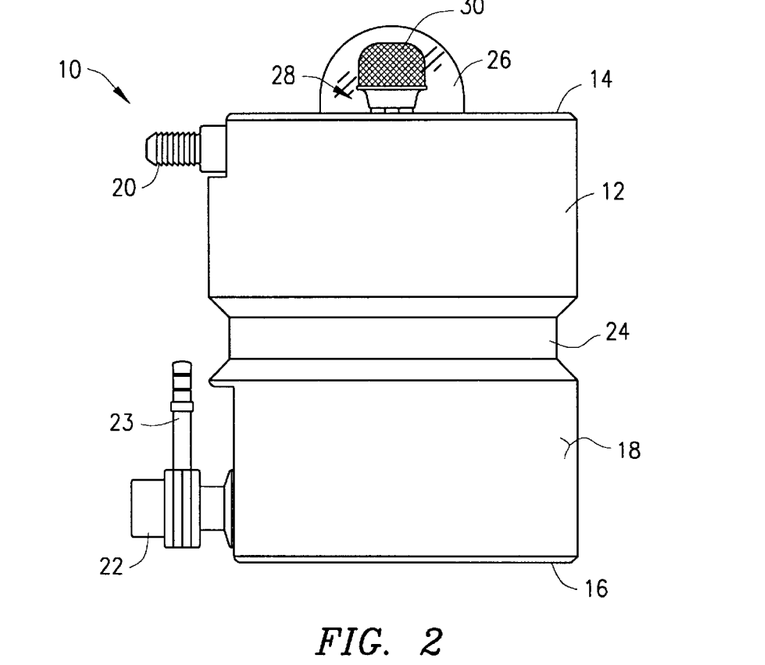
FIG. 2 is a side elevational view of the vacuum system collection vessel of FIG. 1.

Referring now to FIG. 2, there is shown a side elevational view of the vacuum system collection vessel 10 of FIG. 1, wherein the dome 26 is shown disposed around the filter 30. The filter 30 of standpipe 28 is disposed vertically above the intake 20 for purpose of preventing the ingress of liquid into the standpipe 28 as described in more detail below. Also shown this figure is the discharge valve 22 with control valve 23 mounted thereto.

Figure 3:
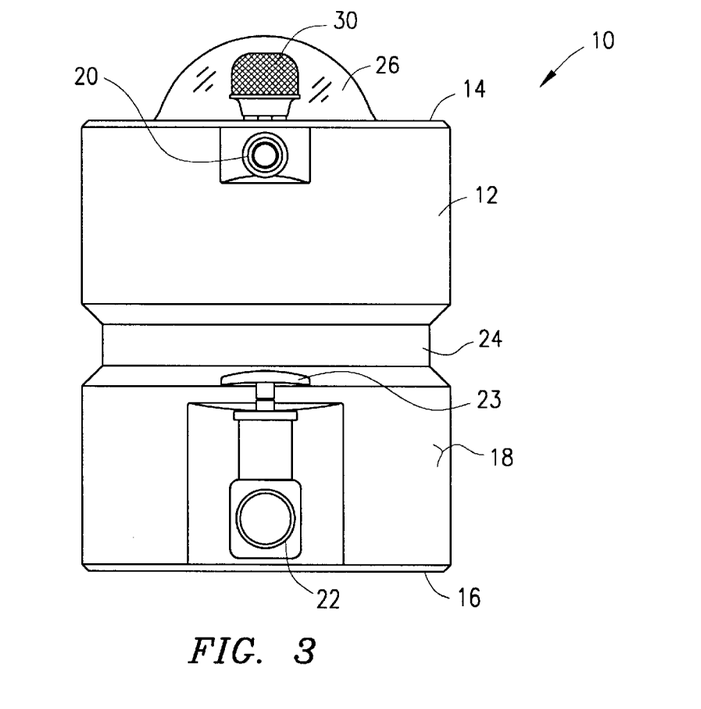
FIG. 3 is a front elevational view of the vacuum system collection vessel of FIG. 1.

Referring now to FIG. 3, there is shown a front elevational view of the vacuum system collection vessel 10 of FIG. 1, wherein the shape of the circumferential indentation 24 around the housing 12 is clearly illustrated. Likewise, the intake fitting 20 is disposed generally vertically above the discharge orifice 22, although other arrangements may be preferable in accordance with the principles of the present invention.

Figure 4:
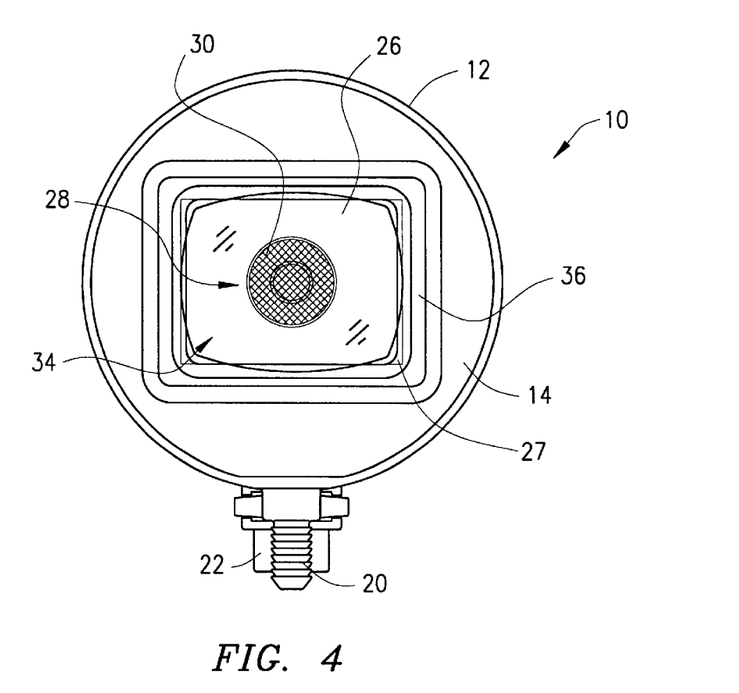
FIG. 4 is a top plan view of the vacuum system collection vessel of FIG. 1.

Referring now to FIG. 4, there is shown a top plan view of the vacuum system collection vessel 10 which more clearly illustrates the placement of the transparent dome 26 over standpipe 28 and filter 30. The rectangular opening 27 that provides access to the internal chamber 34 of housing 12 includes a sealing surface 36 formed therearound. The sealing between the dome 26 and the surface 36 is preferably facilitated by the utilization of gasket material or the like to promote sealing therebetween. Such sealing is necessary to facilitate the vacuum action wherein suction is provided through the vacuum associated with the vacuum system collection vessel 10 as will be described in more detail below.

Figure 5:
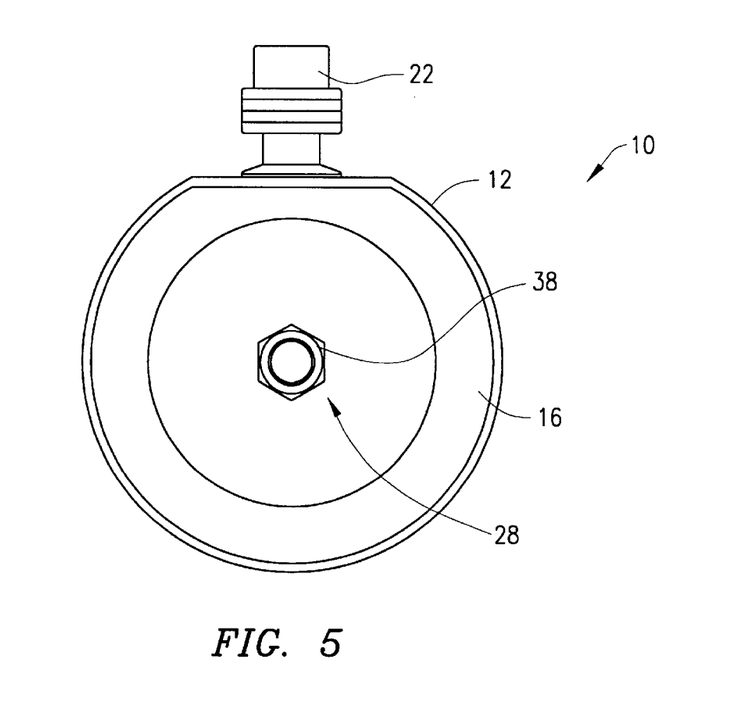
FIG. 5 is a bottom plan view of the vacuum system collection vessel of FIG. 1.

Referring now to FIG. 5, there is shown a bottom plan view of the vacuum system collection vessel 10 of FIG. 1 illustrating the terminal end 38 of standpipe 28 extending through the bottom 16 of housing 12. It is the terminal end 38 of standpipe 28 that is connected to an underlying air vacuum unit (shown in FIG. 9) to afford the vacuum operation disclosed herewith.

Figures 6, 6A, 7:
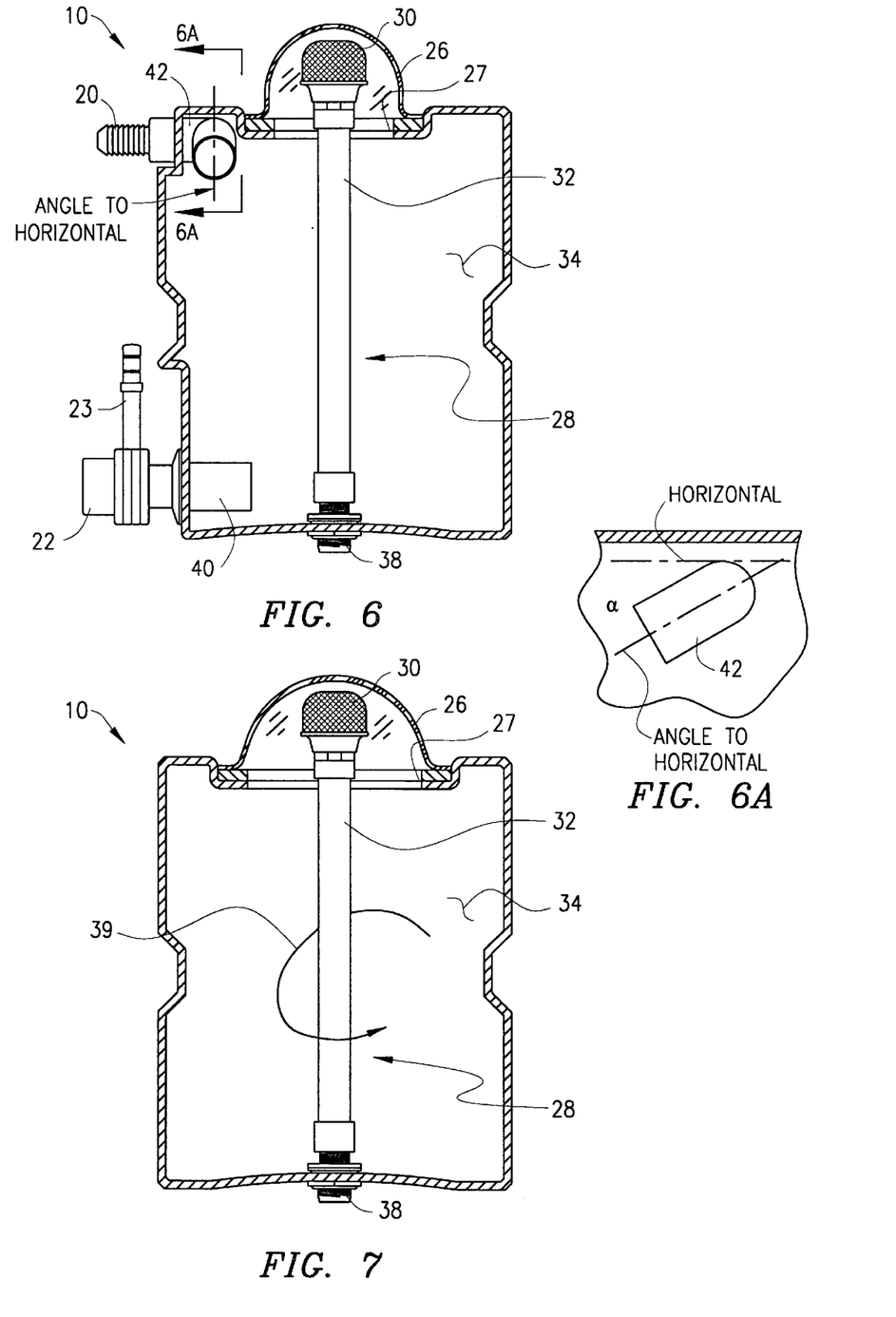
FIG. 6 is a side elevational, cross-sectional view of the vacuum system collection vessel of FIG. 1 taken along line 6—6 thereof.
FIG. 6A is a fragmentary, size elevational view of the angulated conduit section illustrating its angle to the horizontal.
FIG. 7 is a side elevational, cross-sectional view of the vacuum system collection vessel of FIG. 1 taken along line 7—7 thereof.

Referring now to FIG. 6, there is shown a side elevational, cross-sectional view of the vacuum system collection vessel 10 of FIG. 1 taken along line 6—6 thereof. The standpipe 28 is shown to extend from the top to the bottom of the housing 12 and to afford a means for communicating with a vacuum system underlying said housing 12 for creating the suction utilized therewith, as will be shown in FIG. 9. Likewise, the intake fitting 20 and discharge manifold 22 are shown to be constructed with regions extending inwardly into the internal chamber 34 of housing 12. This discharge fitting 22 includes a conduit section 40 extending inwardly into the chamber 34 of housing 12 for purposes of channeling the liquid there through and outwardly thereof. Likewise, the intake fitting 20 includes a angulated conduit section 42 which causes the entering air and liquid to enter the housing 12 tangentially in a downward direction and circulate therearound. A downward angle on the order of 30° from the horizontal has been shown to be most effective in maximizing the fluid flow dynamics and suction efficiency in the particular embodiment shown herein. This angle is shown most clearly in FIG. 6A. Other angles may also have good effectiveness, depending on the overall size and shape of, and operational parameters associated with, the housing 12 of the present invention. What has been discussed is that the circular flow pattern into the housing 12 through the downwardly angulated section 42 of intake fitting 20 produces a descending tangential flow of air and liquid that facilitates greater efficiency in operation.

Referring now to FIG. 7, there is a shown a side elevational cross-sectional view of the vacuum system collection vessel 10 of FIG. 1 taken along line 7—7 thereof, wherein the flow of air and liquid is illustrated by arrow 39 therewith. The descending, tangential flow depicted by arrow 39 of the air and liquid around the standpipe 28 is facilitated by of the drawing of air through the standpipe 28 and through the filter 30. It may be seen that on the liquid level reaches the top of the housing 12, it will cover the discharge conduit 42 (FIG. 6A) to thereby inhibit further sucking of air and liquid through the intake fitting 20 (FIG. 6) and terminate the operation thereof, until the liquid can be dumped through the discharge fitting 22 described above.

Figure 8:
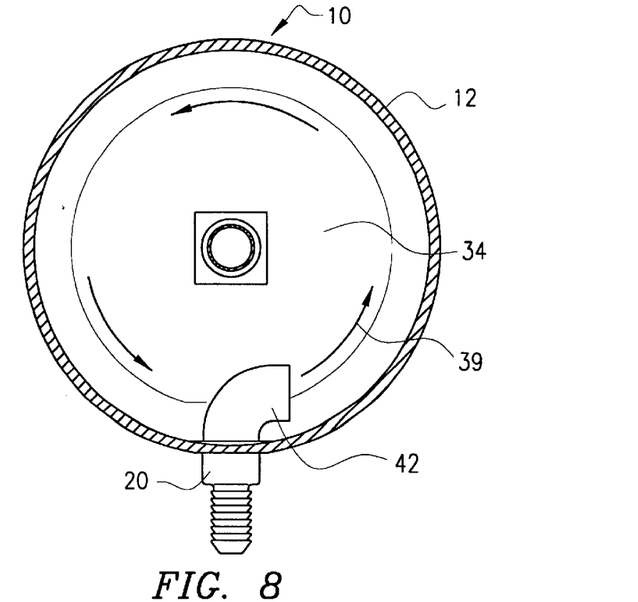
FIG. 8 is a top plan, cross-sectional view of the vacuum system collection vessel of FIG. 1 taken along line 8—8 thereof.

Referring now to FIG. 8, there is shown a top plan, cross-sectional view of the vacuum system collection vessel 10 of FIG. 1, taken along line 8—8 thereof, illustrating the flow of air and liquid therearound as produced by the angulated flow conduit 42 of intake fitting 20. The air and liquid flow in the above-described descending, tangential pattern, illustrated by arrow 39, causes the formation of a vortex therein. The vortex assists the vacuum operation by facilitating entry of the air and liquid into the internal chamber 34. The vortex is perpetuated by constant reintroduction of the air and liquid tangentially into the internal chamber 34 as herein described.

Referring now to FIG. 9, there is shown a perspective view of a complete vacuum system constructed in according to the principles of the present invention. The vacuum system 200 is shown to be constructed with the liquid collection vessel 10 for the air and liquid vacuum system mounted to a frame 210. A strap 212 is shown extending therearound and positioned within the circumferential indentation groove region 24 of the housing 12 discussed above. The frame 210 includes a wheel base 215 which facilitates portability of the overall unit. It is typical for such systems to incorporate an air vacuum system 44 which extends outwardly from the wheel base 215. An intake tube 46 is shown extending between the air vacuum unit 44 and the underneath side of the housing 12 and connected thereto. The air vacuum unit 44 is also a part of the assembly's operational base 100. Within the operational base 100, there typically exists a reservoir for water and a means for generating steam therefrom in association with power and motorized systems that are conventional in the art. It should be noted that the present invention relates directly to the method of and apparatus for air and liquid vacuuming as facilitated by the vessel 12 herein defined. The utilization of vacuum hoses and steam lines associated therewith are for exemplary purposes only and may be selected from those typically used in the art. However, for purposes of specificity, there is shown a vacuuming wand 120 connected to a steam line 122 which extends from the operational base 100. The steam line 122 is connected to the wand 120 in a matter conventional in the art. Likewise, a flexible hose 110 is shown coupled to the intake fitting 20 (FIG. 8), shown on the rear side of the housing 12 and to the wand 20 for purposes of facilitating the flow of air and liquid from the wand 20 through the hose 110 and into the housing 12 in the manner described above.

Operationally, the present invention has enabled a functioning with 260" of water lift where Applicant's older, square tank designs could only show 220" of water lift. Moreover, the present invention can be built with a variety of sizes of housing 12. A 16" housing 12 may be constructed with but a single indentation 24, while a taller, 24" housing 12 may require two indentations for structural integrity. Likewise the angle to the horizontal on the order of 30° for conduit section 42 (as shown in FIG. 6) may vary as set forth above. The optimum angle would be that which produces the greatest water lift for the given housing size. In other words, the size and shape of the housing 12 and the operational parameters may necessitate different angles in certain cases.

In operation, this particular type of unit may be used to discharge hot steam into a carpet where the steam condenses into hot water. The air and liquid vacuuming aspect thus permits the wand to wand 120 to reclaim the discharged water from the surface being cleaned. Such surfaces are typically carpets and such units are typically used by professional carpet cleaners. It is desirable for such professional carpet cleaners to have units that are lightweight and extremely durable for movement on and around stairways and other regions of both commercial and residential areas. It is also typical to have several pump and vacuuming options available. A series of switches 125 are shown diagrammatically atop base unit 100 for illustrating that various modes of operation may be afforded by the system 200 as necessary for particular operations. Notwithstanding the above, the present invention is not to be considered to be limited by the utilization with such hoses and the related structure because variations in the creation of the vacuum within the housing 12 may also provide effective operation in accordance with principles of the present invention.

It is thus believed that the operation and construction of the present invention will be apparent from the foregoing description of the preferred exemplary embodiments. It will be obvious to a person of ordinary skill in the art that various changes and modifications may be made herein without departing from the spirit and the scope of the invention.

What is claimed is:

1. A liquid collection vessel for an air and liquid vacuum system incorporating an air vacuum unit coupled to said vessel for drawing air and liquid therein, said vessel comprising:

a housing having generally cylindrical interior walls;

an intake fitting disposed in an upper region of said housing adapted for receiving air and liquid into said housing in response to said air vacuum unit coupled thereto;

an air intake manifold disposed within said housing and coupled to said air vacuum unit for drawing air out of said housing; and an angulated conduit pivotally coupled with said intake fitting, wherein said conduit is disposed internally within said housing in downward acute angularity relative to the horizontal for tangentially dispersing air and liquid along said generally cylindrical interior walls, thereby creating a circumferentially descending vortex flow pattern, whereby said vortex facilitates increases water lift efficiency therein.

2. The apparatus as set forth in claim 1 wherein said housing further includes a liquid discharge port disposed therein.

3. The apparatus as set forth in claim 2 wherein said liquid discharge port of said housing is disposed in a lower region thereof.

4. The apparatus as set forth in claim 1 wherein said air intake manifold is vertically positioned above said ingress nozzle.

5. The apparatus as set forth in claim 4 wherein said air intake manifold further includes a filter screen disposed thereacross to inhibit the intake of objects carried by air passing there through.

6. The apparatus as set forth in claim 1 wherein said housing further includes a standpipe disposed therein and wherein an upper region of said standpipe forms said air intake manifold, and where a lower region of said standpipe is coupled to said air vacuum unit.

7. The apparatus as set forth in claim 6 wherein said housing has an aperture formed in a lower region thereof for coupling said standpipe in flow communication with said air vacuum unit.

8. The apparatus as set forth in claim 1 wherein said upper region of said housing includes a generally transparent dome upstanding therefrom and facilitating the positioning of said air intake manifold therebeneath and above said ingress nozzle to allow visible observation of a liquid level contained within said housing, while permitting said intake manifold to be disposed above said liquid level within said housing.

9. The apparatus as set forth in claim 1 wherein said intake fitting is constructed with an external coupling region projecting outwardly from said housing and being adapted for removable securement to and in flow communication with a vacuum system hose to facilitate the drawing of air and liquid therein in response to the creation of vortex air flow within said housing.

10. The apparatus as set forth in claim 1 wherein said housing is constructed with at least one circumferential indentation for the structural integrity thereof.

11. The apparatus as set forth in claim 1 wherein said downward acute angularity of said conduit is on the order of 30° from the horizontal.

12. A method of collecting liquid in a vessel in an air and liquid vacuum system, said method comprising the steps of:

forming a housing having generally cylindrical interior walls for the collection of liquid therein;

providing an air vacuum unit coupled to said housing for drawing air and liquid therein;

providing an intake fitting in an upper region of said housing for removably coupling an angulated conduit to said intake fitting;

receiving air and liquid through said intake fitting and into said housing in response to low pressure created by said air vacuum unit coupled thereto;

providing an air intake manifold within said housing and coupled to said air vacuum unit for drawing air out of said housing; and orienting said conduit angularly within said housing for tangentially dispersing air and liquid therein in a circumferentially descending vortex flow pattern along said generally cylindrical interior walls, whereby said vortex facilitates increased water lift efficiency therein.

13. The method as set forth in claim 12 and further including the step of forming a liquid discharge orifice having a valve in a lower region of said housing for selectively eliminating the liquid collected therein.

14. The method as set forth in claim 13 and further including the step of disposing said liquid discharge orifice of said housing in a lower region thereof.

15. The method as set forth in claim 12 and further including the step of positioning said air intake manifold vertically above said intake fitting.

16. The method as set forth in claim 15 and further including the step of providing a filter screen and securing said filter screen around said air intake manifold to inhibit the intake of objects carried by air passing there through.

17. The method as set forth in claim 16 and further including the step of providing a standpipe and disposing said standpipe within said housing wherein the upper region of said standpipe forms said intake manifold and a lower region of said standpipe is coupled to said air vacuum unit.

18. The method as set forth in claim 17 and further including the step of forming on said housing an aperture in a lower region thereof, and mounting said standpipe in flow communication with said aperture in said lower region of said housing for facilitating the coupling of said standpipe to said air vacuum unit.

19. The method as set forth in claim 12 and further including the steps of constructing said upper region of said housing with an opening for facilitating the positioning of said air intake manifold therein and above said ingress nozzle, providing a transparent dome, and mounting said dome over said opening to allow for visible observation of a liquid level contained within said housing, while permitting said intake manifold to be disposed above said liquid level within said housing.

20. The method as set forth in claim 12 and further including the steps of forming on said intake fitting an external coupling region projecting outwardly from said housing and being adapted for removable securement to and in flow communication with a vacuum system hose to facilitate the drawing of air and liquid therein in response to the creation of vortex air flow from within said housing.

21. The method as set forth in claim 12 wherein said housing is formed having an indentation region molded about the perimeter of said housing for increasing the structural integrity, thereby preventing said housing to collapse during operation of said air vacuum unit.

22. The method as set forth in claim 12 wherein said step of orienting said conduit includes the step of orienting said conduit downwardly on the order of 30° from the horizontal.

* * * * *

UNITED STATES PATENT AND TRADEMARK OFFICE
CERTIFICATE OF CORRECTION

PATENT NO.      : 6,533,833 B1
DATED           : March 18, 2003
INVENTOR(S)     : Mark Schmitz It is certified that error appears in the above-identified patent and that said Letters Patent is hereby corrected as shown below:

<u>Title page, Item [54] and Column 1, lines 1 and 2,</u>
Replace "METHOD OF APPARATUS FOR AIR AND LIQUID VACUUMING" with -- METHOD OF AND APPARATUS FOR AIR AND LIQUID VACUUMING --

<u>Column 2,</u>
Line 3, replace "system itself The" with -- system itself. The --

<u>Column 3,</u>
Line 19, replace "thereof, and" with -- thereof; and --

Signed and Sealed this

Twenty-second Day of July, 2003

JAMES E. ROGAN
*Director of the United States Patent and Trademark Office*